Dec. 10, 1963 L. D. SEADER 3,114,134

SWITCHING CIRCUIT

Filed July 26, 1957 6 Sheets-Sheet 1

INVENTOR.
LEONARD D. SEADER

BY John B. Clark

ATTORNEY

Dec. 10, 1963 L. D. SEADER 3,114,134

SWITCHING CIRCUIT

Filed July 26, 1957 6 Sheets-Sheet 3

Dec. 10, 1963 L. D. SEADER 3,114,134

SWITCHING CIRCUIT

Filed July 26, 1957 6 Sheets-Sheet 4

Dec. 10, 1963 L. D. SEADER 3,114,134

SWITCHING CIRCUIT

Filed July 26, 1957 6 Sheets-Sheet 6

United States Patent Office
3,114,134
Patented Dec. 10, 1963

3,114,134
SWITCHING CIRCUIT

Leonard D. Seader, Santa Clara County, Calif., assignor to International Business Machines Corporation, New York, N.Y., a corporation of New York
Filed July 26, 1957, Ser. No. 674,511
4 Claims. (Cl. 340—172.5)

The present invention relates generally to switching circuits and pertains more particularly to circuits for providing access to storage.

In data processing devices wherein a plurality of transducers is utilized for providing access to corresponding storage media, it is necessary to associate the transducers selectively with the processing circuitry for providing access to the desired media. The problem is one of selectively switching the transducers into an operative relationship with the processing circuitry under control of instructions of one type or another. The present invention is directed to this problem, and one object thereof is to provide an improved transducer switching circuit.

When switching transducers which cooperate with magnetic media, mechanical switching has been utilized. However, such circuits have been found to have disadvantages such as slow operating time or other problems brought about by the very low order signals involved. The latter problem has been compensated for to some extent by providing amplification of the signals prior to the switching operation. However, this proves to be expensive when a large number of transducers is involved since it is necessary to provide an amplifier for each transducer.

According to the invention, the various transducers are arranged in a two-coordinate matrix wherein selected transducers defined by two coordinates are rendered effective for reading or recording data signals under control of a signal which defines a read or record operation. Thus, the same matrix as well as the selection control therefor is utilized for both reading and recording operations. Data to be recorded is gated to several transducers defined by one coordinate, the other coordinate being arranged to define one of the several transducers. The "read" output from all transducers is common, the two coordinates being arranged to render only a single transducer operative for generating read signals.

Another object of this invention is to provide a novel electronic switching circuit for selectively switching magnetic transducers by electronic methods.

A further object is to provide a transducer switching circuit having a fast switching time.

A still further object is to provide an electronic switching circuit for controlling the selection of transducers for reading and recording wherein a single read amplifier is utilized for cooperating with the various transducers.

Still another object is to provide a common transducer selection matrix for both reading and recording operations.

Other objects of the invention will be pointed out in the following description and claims and illustrated in the accompanying drawings which disclose, by way of example, the principle of the invention and the best mode which has been contemplated of applying that principle.

Figure 3:
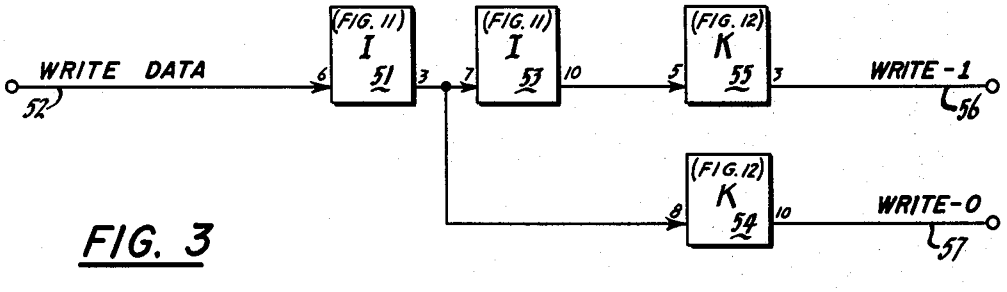

FIG. 3, together with FIGS. 4 through 7, comprises a circuit diagram of the disclosed embodiment of the invention.

FIGS. 8 through 14 comprise schematic diagrams of the various electronic components shown in block form in FIGS. 3 through 7.

Throughout the description it will be assumed that transducers associated with the various recording media (not shown) are designated by suitable addresses which are generated and are entered into a register 10 (FIG. 1) in any convenient manner. For example, these addresses may be defined by a 6-bit binary code having two zone bits, $B_0$ and $B_X$, and four numerical bits, $B_1$, $B_2$, $B_4$ and $B_8$. The circuitry disclosed herein is arranged for operating in accordance with such an address; however, it should be understood that this should in no way limit the invention since various modifications for rendering the circuitry suitable for a specific application will be readily apparent to those familiar with the art.

After the address of a selected transducer has been entered into the register 10, it is analyzed and decoded by a decoder 11 for generating signals corresponding thereto. For example, if an address in the register 10 contains an X bit, a line 12, designated the "$T_z=X$" line, is high. Similarly, if the address contains a 0 bit, a line 13, the "$T_z=0$" line, is high. If there is no 0 bit and no X bit in the address, i.e., if the address is purely numeric, then a line 14, the "$T_z=NUM$" line, is high.

Figure 1:
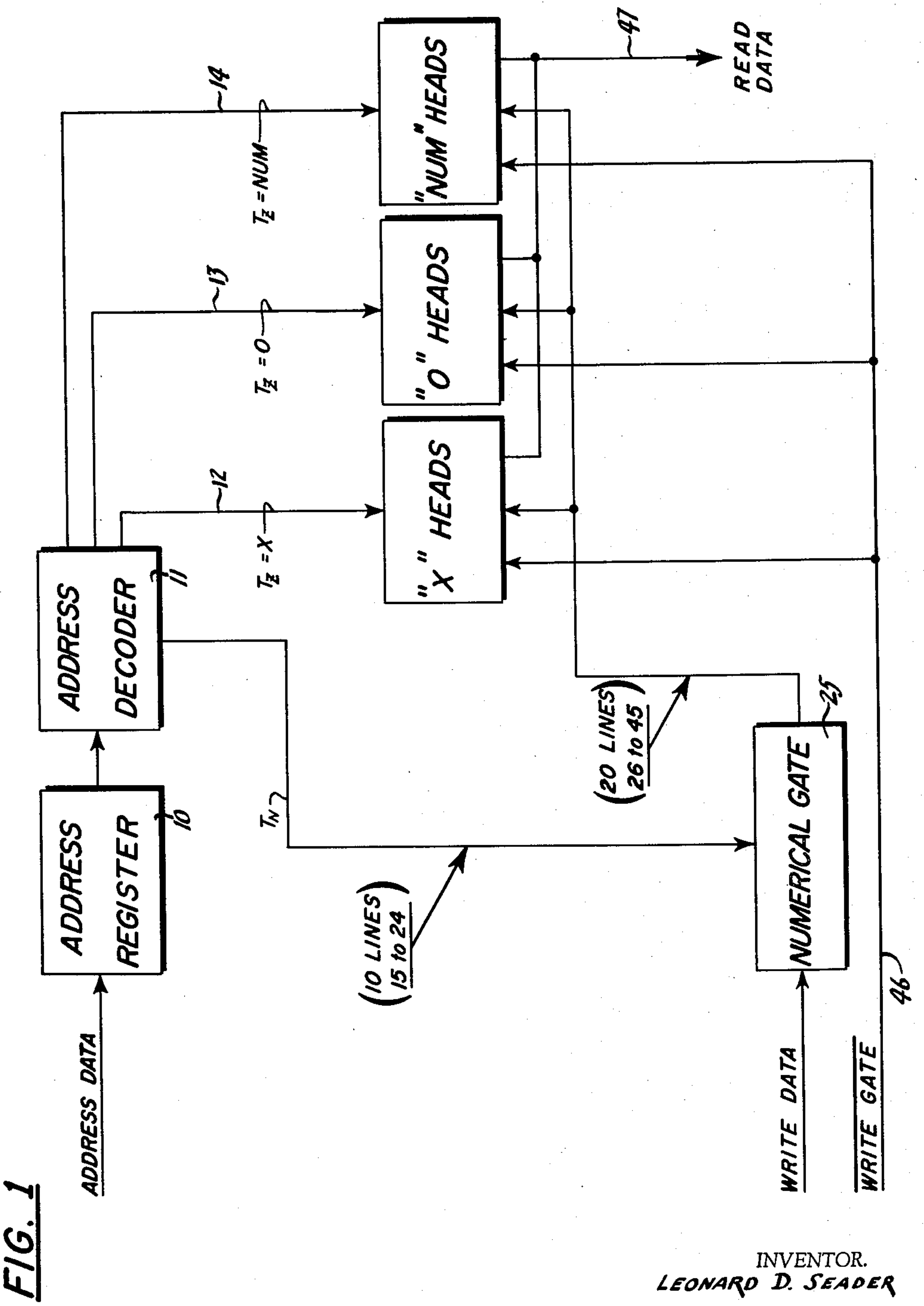
FIG. 1 is a block diagram of the disclosed embodiment of the invention.

In addition to decoding the zone bits, the unit 11 is arranged to decode the numerical portion of an address for controlling the potential of ten lines 15 through 24 (only one line, $T_n$, being shown in FIG. 1). For example, if the address in the register 10 includes a "2" bit and a "4" bit, the decoder is arranged to generate a signal on a line 21 (FIG. 4), the "$T_n=6$" line, which is one of the ten lines 15 through 24 provided for indicating the numerical portion of the address.

The circuitry for the register 10 (FIG. 1) and decoder 11 is not shown or described herein since these units form no portion of the invention and since suitable circuits for providing the stated functions thereof are well known. It is sufficient for the purposes of the present invention to understand that the signals on the $T_z$ lines 12, 13 and 14, as well as the signals on the $T_n$ lines 15 through 24, are generated according to addresses of selected transducers. The various transducers are arranged in a matrix wherein they are selected according to two coordinates defined by the address thereof. Figuratively speaking, the transducers are arranged in columns and rows. Accordingly, the $T_z$ lines 12, 13 and 14 define the column, the $T_n$ lines being adapted to specify the row.

The $T_n$ lines connect to a gating circuit 25 for gating signals representative of write data onto selected lines 26 through 45 determined according to the condition of the $T_n$ lines 15 through 24. The lines 26 through 45 are arranged in pairs, only one pair of said lines being rendered active at a time according to the numerical portion of the address. The lines 26 through 35 are termed the "bit" lines, the lines 36 through 45 being termed the "no bit" lines. Thus, on a write operation the lines of a selected pair are alternately high according to the write data. On a read operation, the lines 26 through 35 are controlled to be low, the lines 36 through 45 being high at this time. Referring again to FIG. 1, it will be noted that a "no write gate" signal (referred to hereinafter as the $\overline{WG}$ signal) is applied via a line 46 to each of the X, 0 and numerical transducer circuits for determining write and read operations. Additionally, it should be noted that the various transducers associated with the matrix are all connected in such a way that the read signals taken therefrom are entered onto a common line 47 for transmission to a suitable amplifier (not shown).

To simplify the drawings, the various electronic components utilized in the circuitry disclosed in FIGS. 3 through 7 are shown in block form. Each of these blocks is provided with descriptive initials for indicating the function thereof as well as a figure number which refers to a figure in the drawings depicting the detailed circuitry thereof. Thus, for example, the various "AK" units are "and" units having cathode follower outputs; similarly, "K" defines cathode followers, "I" defines inverters, "CD" defines current drivers, "IK" defines inverters having a cathode follower output, and "D" defines diodes. Since each of the circuits shown in FIGS. 8 through 14 is self-explanatory in its operation and is well known in the art, a further description thereof is not given herein.

Referring now to FIG. 3, it will be seen that the write signals are entered onto the #6 tap of an I unit 51 via a line 52. In the present embodiment, the non-return-to-zero type of recording is utilized. It will be recalled that this type of recording controls saturation of the magnetic record in one direction or the other depending upon whether a "bit" or a "no bit" condition is to be recorded. Accordingly, the line 52 is high when the write data contains a bit and is low when the data contains no bit. The output of the inverter 51 connects to the #7 tap of an inverter 53 as well as to the #8 tap of a cathode follower 54, the output of the inverter 53 being connected through a cathode follower 55 to a line 56. The line 56 is termed the "write 1" line, a line 57 connected to the #10 tap of the cathode follower 54 being termed the "write 0" line. Thus, when a bit is present in the write data, the "write 1" line 56 is high, the "write 0" line 57 being high when no bit is present. It should additionally be noted that means (not shown) are provided for maintaining the line 52 low during a read operation, thereby maintaining the line 56 low and the line 57 high.

The "write 1" line 56 connects to the #6 tap of each of ten AK units 61 through 70, the "write 0" line 57 being connected to the #7 tap of each of ten AK units 71 through 80. The ten $T_n$ lines 15 through 24 connect to the #5 taps of corresponding AK units 61 through 70, these lines being additionally connected to the #8 taps of corresponding AK units 71 through 80. Thus, the "write 1" signals taken from the line 56 are mixed in the AK units 61 through 70 with the $T_n$ signals for controlling the potential of the ten lines 26 through 35. Similarly, the "write 0" signals taken from the line 57 are mixed in the AK units 71 through 80 with the $T_n$ signals for controlling the potential of the lines 36 through 45. Thus, for example, if the numerical portion of the address is equal to 6, i.e., if $T_n=6$, only the line 21 is high, thereby raising the potential of the #5 tap of the AK unit 67 and of the #8 tap of the AK unit 77. When the "write 1" line 56 is high, as it is when it is desired to record a bit, the output line 32 is high. Conversely, when no bit is to be recorded, the output line 42 is high. The line 42 is also high on read operations since, as described earlier, the line 57 is high at this time, the line 32 being low on a read operation.

Ten transducers 81 through 90 (FIG. 5) associated with the "$T_z=X$" column of the transducer matrix connect across the #3 and #10 taps of corresponding CD units 91 through 100. Also, each pair of the lines 26 through 45 connects to the #5 and #8 taps of corresponding CD units 91 through 100, as well as to the #5 and #8 taps of corresponding CD units associated with the "$T_z=0$" and "$T_z=NUM$" columns (FIGS. 6 and 7) for controlling the direction of current flow through the corresponding transducer. Before proceeding with a description of the circuitry shown in FIGS. 5, 6 and 7, reference is made to FIG. 2 wherein only the transducer 81 and current driver 91 are shown in connection with a schematic diagram of the "$T_z=X$" switching circuitry. The address of the transducer 81 is X1, i.e., the address contains an X bit and a 1 bit. Thus, when this transducer is selected, the "$T_z=X$" line 12 is rendered high for selecting the corresponding column. Additionally, the gates 62 and 72 (FIG. 4) are opened for selecting the corresponding row.

Transducer selection for reading or recording is accomplished by controlling the current available to the selected transducer. Write current is drawn through the load 107 of a cathode follower 105 and through a diode 106, the diode 106 being connected between the cathode of the cathode follower 105 and the cathodes of the various CD units of that column. On the other hand, read current is drawn through a resistor 108, the resistor 108 being substantially higher in resistance than the resistor 107 for limiting the read current to that necessary for reading. Read current always flows through the resistor 108; however, the flow of write current through the diode 106 is determined according to the condition of the $\overline{WG}$ line 46, the diode 106 being cut off when the $\overline{WG}$ line is high, i.e., when not on a write operation. It is for this reason that the line 46 connects through a diode 104 to the control grid of the cathode follower 105. When the $\overline{WG}$ line 46 is high the cathode follower 105 conducts, rendering its cathode high, thereby cutting off the diode 106 and preventing the flow of write current. When the $\overline{WG}$ line is low, however, as it is on a write operation, the cathode of the cathode follower 105 is low, the diode 106 conducts and the necessary write current is available.

Thus far the circuitry for determining read and write current has been described, the actual selection of the desired transducer being accomplished under control of the $T_z$ and $T_n$ lines. As mentioned previously, the various transducers are arranged in columns and rows, the $T_z$ portion of the transducer address defining a column of transducers and the $T_n$ portion defining a row of transducers. Both read and write current is cut off in all transducers associated with non-selected columns under the control of the corresponding $T_z$ lines.

Figure 2:
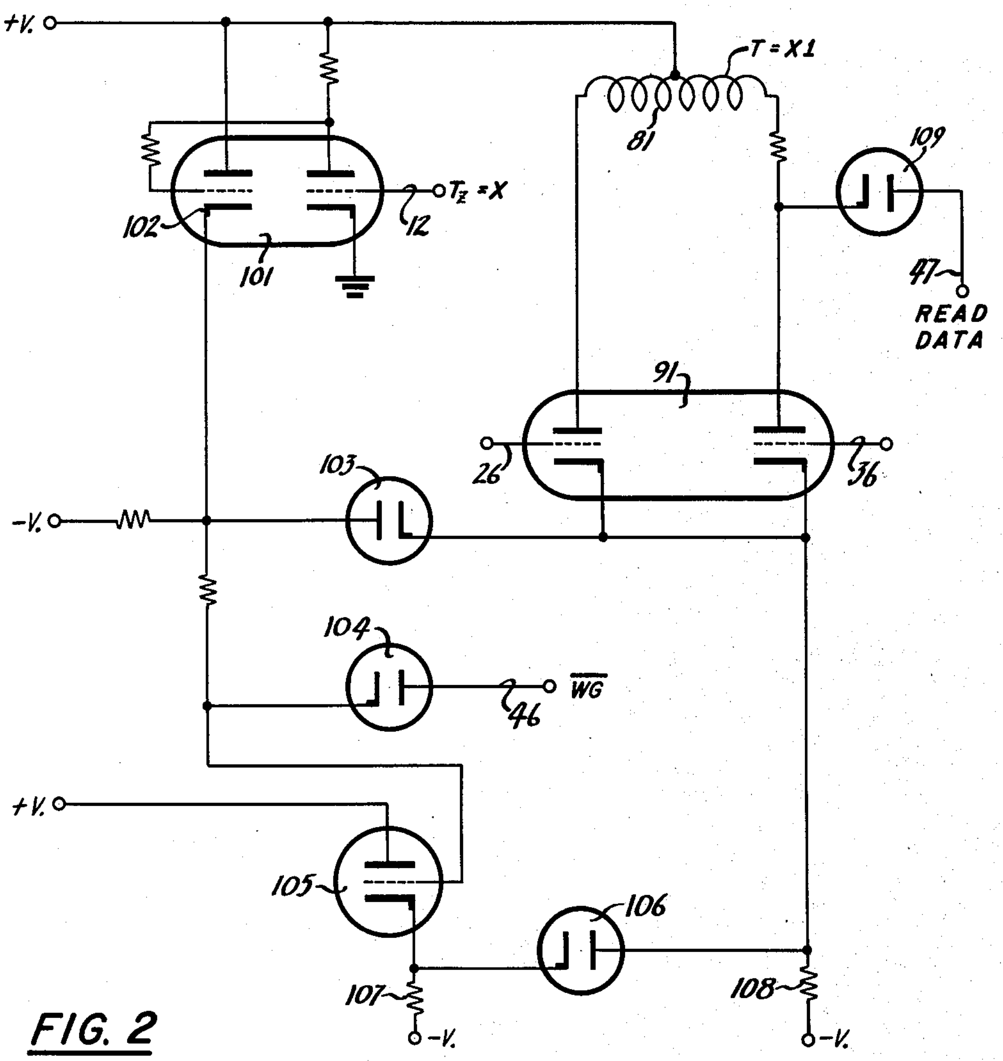
FIG. 2 is a partial schematic diagram of the switching circuitry of the invention.
Figure 4:
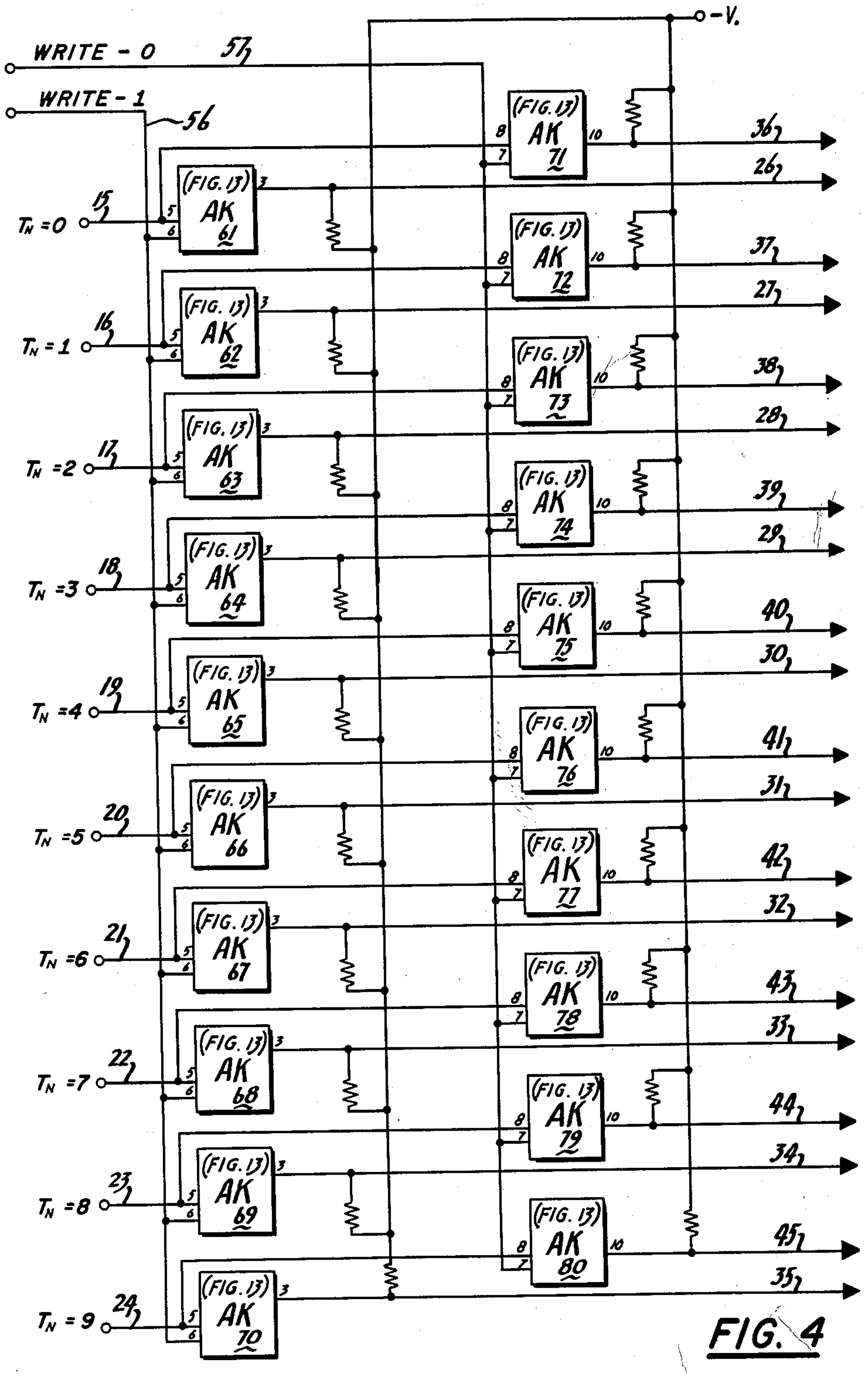
Figure 5:
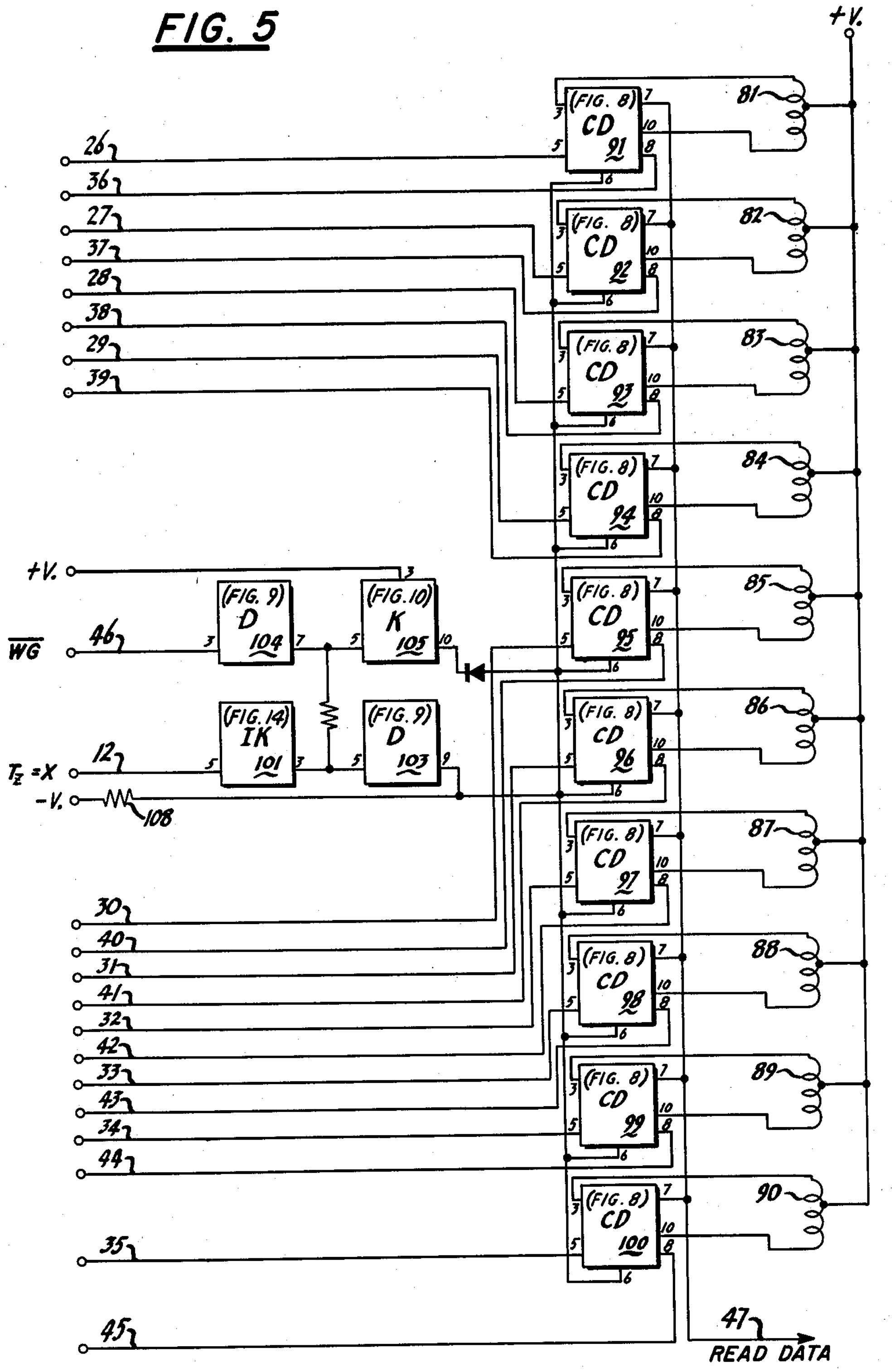

Each $T_z$ line connects to the input of a corresponding IK unit 101, 101′ or 101″ (FIGS. 5, 6 and 7), the "$T_z=X$" line 12 being connected to the input of the unit 101 (FIG. 2). The output of the unit 101 connects through a diode 103 to the cathodes of the CD units 91 through 100, only the unit 91 being shown in FIG. 2. When the line 12 is high, the diode 103 is cut off. However, when the line 12 is low, as it is when $T_z \neq X$, the diode 103 conducts, thereby bypassing any read and/or write current flowing in the circuit. Thus, read and/or write current, depending upon the $\overline{WG}$ signal, is available for reading or writing only in the circuit containing the transducers in the column defined by the $T_z$ portion of the address.

Each pair of the lines 26 through 45, i.e., each pair 26—36, 27—37, 28—38, etc., is associated with a corresponding row of transducers, each such pair being connected to the #5 and #8 taps of each of the CD units associated with the transducers of the corresponding row. Unless specified by the $T_n$ portion of the address, these lines are low in potential, thereby maintaining the corresponding CD units cut off to prevent reading and/or writing. Only the CD units associated with the row defined by the numerical portion of the address are operative for reading or writing. Since no current is available to a transducer unless it is in a selected column and since all CD units not associated with a selected row are cut off, only the transducer defined by the address entered in register 10 is operative.

Figures 6, 7:
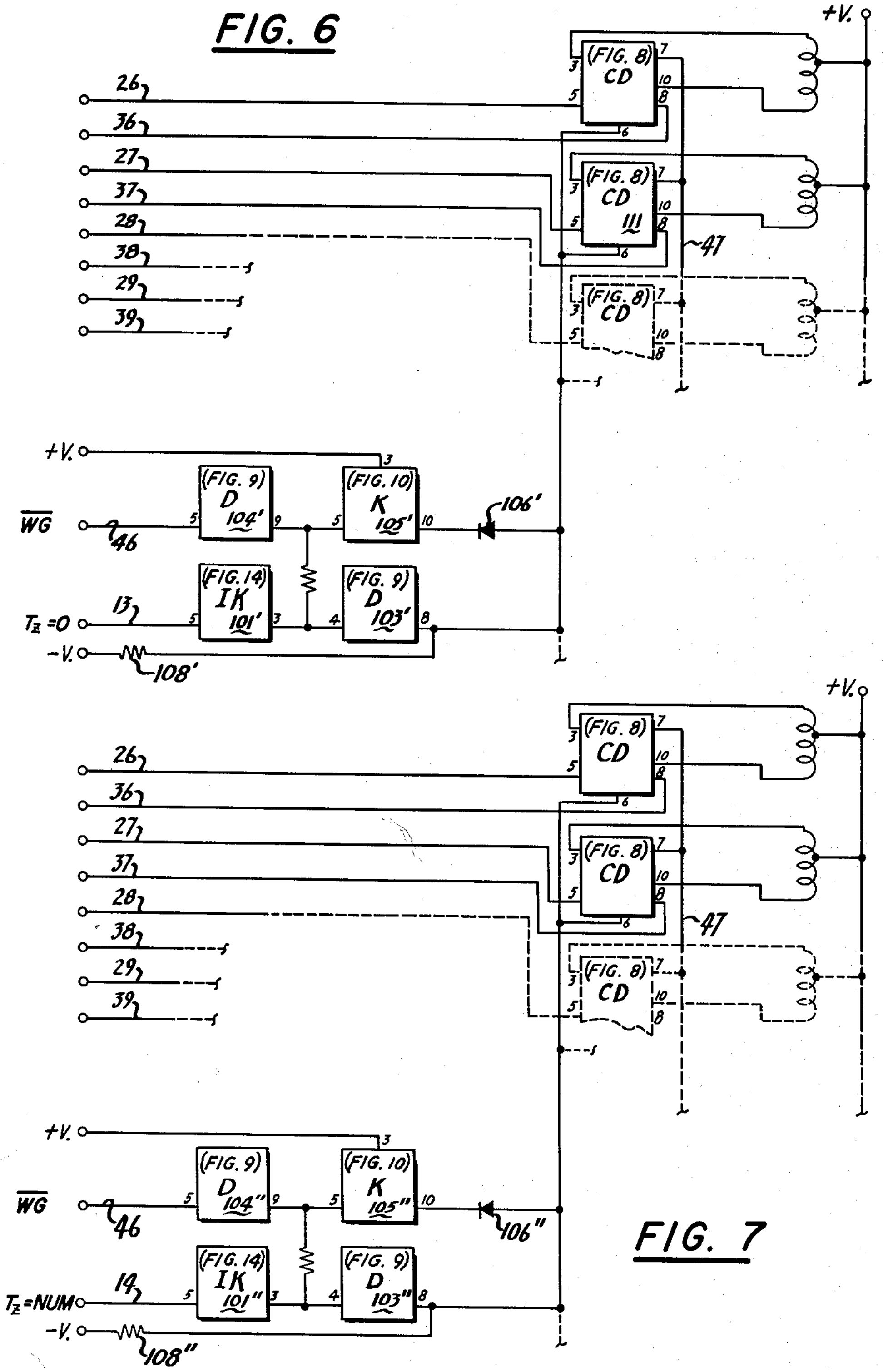
Figure 10:
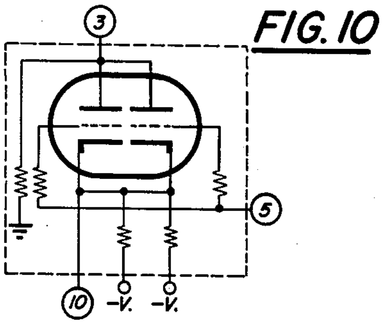
Figure 9:
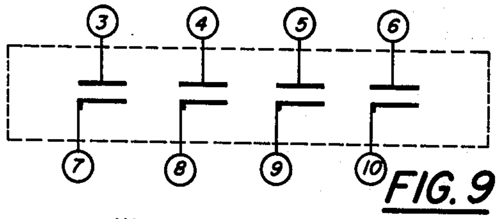
Figure 8:
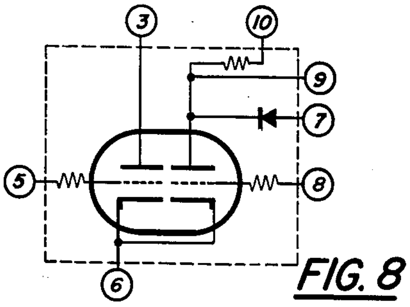
Figure 11:
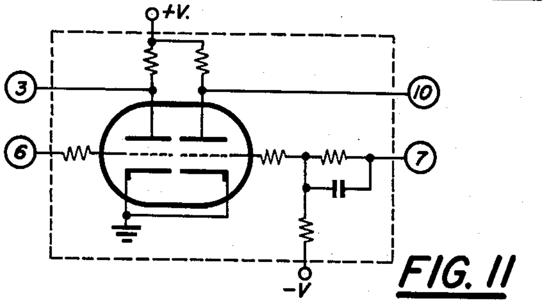
Figure 13:
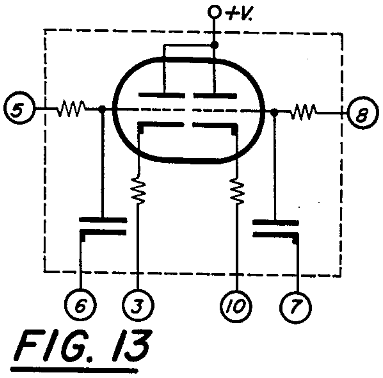
Figure 12:
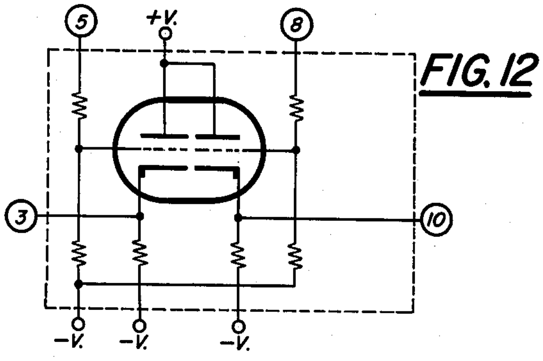
Figure 14:
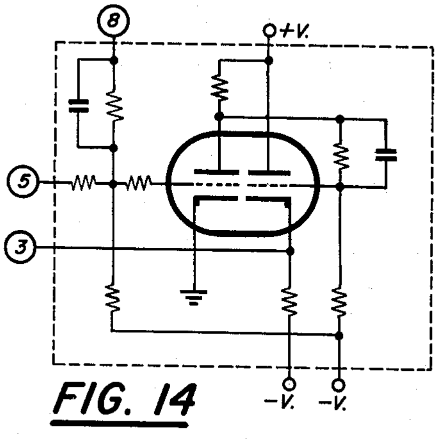

Portions of the CD units and their respective transducers associated with the "$T_z=0$" and "$T_z=NUM$" portions of the matrix are shown in FIGS. 6 and 7, respectively, and the selection of one of these transducers is accomplished in a similar manner. For example, selection of transducer 02 is accomplished by letting $T_z$ equal 0 and $T_n$ equal 2. This transducer, identified by the reference numeral 111, is rendered operative for reading or recording under control of the lines 27 and 37, as well as the "$T_z=0$" line 13.

Thus far, transducer selection for write operations has been discussed, selection of a column being made according to $T_z$ and selection of a row being made by gating data signals thereto under control of $T_n$. Selection for reading is accomplished in the same way, the column being defined by $T_z$ and the row being defined by $T_n$. On read, however, the line 52 (FIG. 3) is maintained low, thereby rendering the #5 taps of CD units defined by $T_n$ low. Accordingly, the #8 taps of these units are high. Thus, only that portion of the selected CD unit associated with the #8 tap thereof conducts on read operations.

The #7 tap of each of the various CD units connects to the common read line 47. On read, the current flowing in the selected CD unit is limited to that necessary for reading under control of the $\overline{WG}$ signal, this current being insufficient to record or erase. Since this current is flowing only in the selected CD unit, the other units being cut off, signals applied to the line 47 result from voltages induced in selected transducers according to the data recorded on the medium associated therewith. Thus, but a single read amplifier driven by signals entered on the line 47 is necessary, thereby substantially reducing the number of circuit components. Also, since the same transducer selection circuits are used for both reading and writing, additional simplicity is achieved.

While there have been shown and described and pointed out the fundamental novel features of the invention as applied to the preferred embodiment, it will be understood that various omissions and substitutions and changes in the form and details of the device illustrated and in its operation may be made by those skilled in the art without departing from the spirit of the invention. It is the intention, therefore, to be limited only as indicated by the scope of the following claims.

What is claimed is:

1. A transducer selection apparatus for selecting one of a plurality of transducers arranged in a two dimensional form of a plurality of rows and columns, wherein each transducer is uniquely defined by the specification of a row coordinate and a column coordinate, as represented by a first row signal and a second column signal, respectively, comprising:
   - a plurality of transducers, each transducer having a winding;
   - a source of current;
   - gating means responsive to a first row signal representing one of said plurality of rows for gating current from said source to all of said windings in the row selected by said first row signal;
   - variably controllable impedance means in parallel circuit to all the windings in each column, said variable impedance means normally having an impedance which is relatively lower than that of said windings, whereby current gated to each winding in the row of windings selected by said first row signal is normally shunted away from said windings through said impedance means;
   - control means responsive to a second column signal representing one of said plurality of columns for increasing the impedance of said impedance means for only the selected one of said plurality of columns, whereby only the winding uniquely defined and selected by said first row signal and said second column signal is not shunted and therefore conducts current gated thereto.

2. A transducer selection apparatus for selecting one of a plurality of transducers arranged in a two dimensional form of a plurality of rows and columns, wherein each transducer is uniquely defined by the specification of a row coordinate and a column coordinate, as represented by a first row signal and a second column signal, respectively, comprising:
   - a plurality of transducers, each transducer having a winding;
   - a source of current;
   - gating means responsive to a first row signal representing one of said plurality of rows for gating current from said source to all of said windings in the row selected by said first row signal;
   - a plurality of normally low impedance current paths, one for each different column of windings, with each said current path being connected in parallel circuit to all the windings in only one column, whereby any current gated to the windings is normally bypassed by said normally low impedance current path;
   - control means in each said current path and responsive to a second column signal for increasing the impedance of only one of said current paths, whereby only the winding uniquely defined and selected by said first row signal and said second column signal is not bypassed by a low impedance current path and therefore conducts current gated thereto.

3. A transducer selection apparatus for selecting, for reading or recording data signals, one of a plurality of transducers arranged in a two dimensional form of a plurality of rows and columns, wherein each transducer is uniquely defined by the specification of a row coordinate and a column coordinate, as represented by a first row signal and a second column signal, respectively, comprising:
   - a plurality of transducers, each transducer having a winding;
   - a first source of current;
   - a second source of current;
   - gating means responsive to a first row signal representing one of said plurality of rows for gating current from said first and second sources to all of said windings in the row selected by said first row signal;
   - variably controllable impedance means in parallel circuit to all the windings in each column, said variable impedance means normally having an impedance which is relatively lower than that of said windings, whereby current gated to each winding in the row of windings selected by said first row signal is normally shunted away from said windings through said impedance means;
   - first control means responsive to a second column signal representing one of said plurality of columns for increasing the impedance of said impedance means for only the selected one of said plurality of columns, whereby only the winding uniquely defined and selected by said first row signal and said second column signal is not shunted and therefore conducts current gated thereto;
   - second control means responsive to a third signal representing a nonrecord operation for rendering one of said current sources ineffective, whereby reading or recording with a transducer selected by said first and second signals is determined by said third signal.

4. A transducer selection apparatus for selecting, for reading or recording data signals, one of a plurality of transducers arranged in a two dimensional form of a plurality of rows and columns, wherein each transducer is uniquely defined by the specification of a row coordinate and a column coordinate, as represented by a first row signal and a second column signal, respectively, comprising:
   - a plurality of transducers, each having a winding;
   - gating means;
   - means for supplying read current and write current through said gating means to all the windings in the row selected by said first row signal, said gating means being further operative to control the direction of current flow through said selected windings in response to data signals representing data to be recorded;
   - a plurality of normally low impedance current paths, one for each different column of windings, with each said current path being connected in parallel circuit to all the windings in only one column, whereby any current gated to the windings is normally bypassed by said normally low impedance current path;
   - means responsive to a second column signal for increasing the impedance of only the one current path corresponding to the selected column of windings, whereby only the winding uniquely defined and selected by said first row signal and said second column signal is not bypassed by a low impedance current path and therefore conducts current gated thereto;

means common to all of said windings for receiving read signals generated therein; and control means for interrupting the flow of write current in response to a third signal representing a non-record operation, whereby reading or recording with a transducer selected by said first row and second column signals is determined by said third signal.

References Cited in the file of this patent

UNITED STATES PATENTS

| | | |
|---|---|---|
| 1,331,151 | Hopkins | Feb. 17, 1920 |
| 1,547,964 | Semat | July 28, 1925 |
| 2,540,654 | Cohen | Feb. 6, 1951 |
| 2,849,703 | Bindon | Aug. 26, 1958 |
| 2,913,706 | Thorensen | Nov. 17, 1959 |
| 2,932,008 | Hoberg | Apr. 5, 1960 |

FOREIGN PATENTS

| | | |
|---|---|---|
| 769,384 | Great Britain | Mar. 6, 1957 |